Patented Feb. 9, 1932

1,844,398

UNITED STATES PATENT OFFICE

HANS KÄMMERER, OF MANNHEIM, AND KARL HOLZACH, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

MANUFACTURE OF DYESTUFFS CONTAINING CHROMIUM

No Drawing. Application filed February 17, 1928, Serial No. 255,176, and in Germany August 6, 1925.

This application is a continuation in part of our co-pending application Ser. No. 124,776, filed July 24, 1926, in which application we have shown that chromium compounds of o-hydroxy-azo-dyestuffs are most advantageously produced by carrying out the chromation in a closed vessel, at a temperature sufficiently above 100° C. to produce superatmospheric pressure, but below the temperature at which the dyestuffs are destroyed.

Now the present application is for the chromation of a specific class of dyestuffs under elevated pressure, namely such dyestuffs as are obtainable by coupling a diazotized o-hydroxy-amino compound with an aceto-acetic ester (which term is used in this specification and the appended claims in a broad sense including derivatives of aceto-acetic ester such as aceto-acetic arylides and the like. Also in the case of such initial dyestuffs great advantages are experienced by carrying out the chromation under elevated pressure and in particular the time of heating, necessary for the formation of the chromium compounds is considerably reduced. As has been broadly stated already in the aforesaid application Ser. No. 124,776, it is often advantageous also in this specific case to subject the dyestuffs containing chromium so obtained to a subsequent treatment with alkaline agents in the manner described in the German Patent 419,825.

The following example will further illustrate the nature of the said invention which however is not limited thereto. The parts are by weight.

Example 43 parts of the azo dyestuff corresponding probably to the formula:

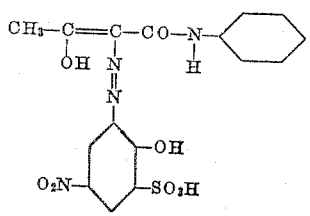

obtainable from diazotized 4-nitro-2-aminophenol-6-sulphonic acid and aceto-acetic anilide are heated with 1500 parts of water and an aqueous solution prepared from 11 parts of chromium oxid (in the state of moist hydrate) and 20 parts of formic acid, in an enamelled autoclave to 130° centigrade for 2 hours while stirring. After cooling, the complex chromium compound of the dyestuff is separated by the addition of common salt, filtered off and dried. The product is readily soluble in water with a brownish-yellow coloration and dyes wool yellow shades of very good fastness to washing, milling and light.

When treating in the same manner the azo dyestuff obtainable from the same diazo compound and aceto-acetic ethyl-ester, a chromium compound of similar properties is obtained which dyes wool yellow shades of a somewhat more reddish tinge.

What we claim is:

1. In the production of chromium compounds of o-hydroxyazo dyestuffs obtainable from an o-hydroxydiazo compound and an aceto-acetic arylide, the step which comprises heating an o-hydroxy azo dyestuff of the said kind with a chromium compound capable of reacting therewith, in a closed vessel at a temperature sufficiently above 100° C. to produce superatmospheric pressure, but below the temperature at which the dyestuff is destroyed.

2. The process of producing a chromiferous o-hydroxy-azo dyestuff which comprises heating the o-hydroxy-azo dyestuff obtainable from diazotized 4-nitro-2-aminophenol-6-sulphonic acid and aceto-acetic anilide with a chromium formate solution in a closed vessel at 130° C.

In testimony whereof we have hereunto set our hands.

HANS KÄMMERER.
KARL HOLZACH.